G. R. JACKSON.
SKYLIGHT.
No. 18,851.  Patented Dec. 15, 1857.
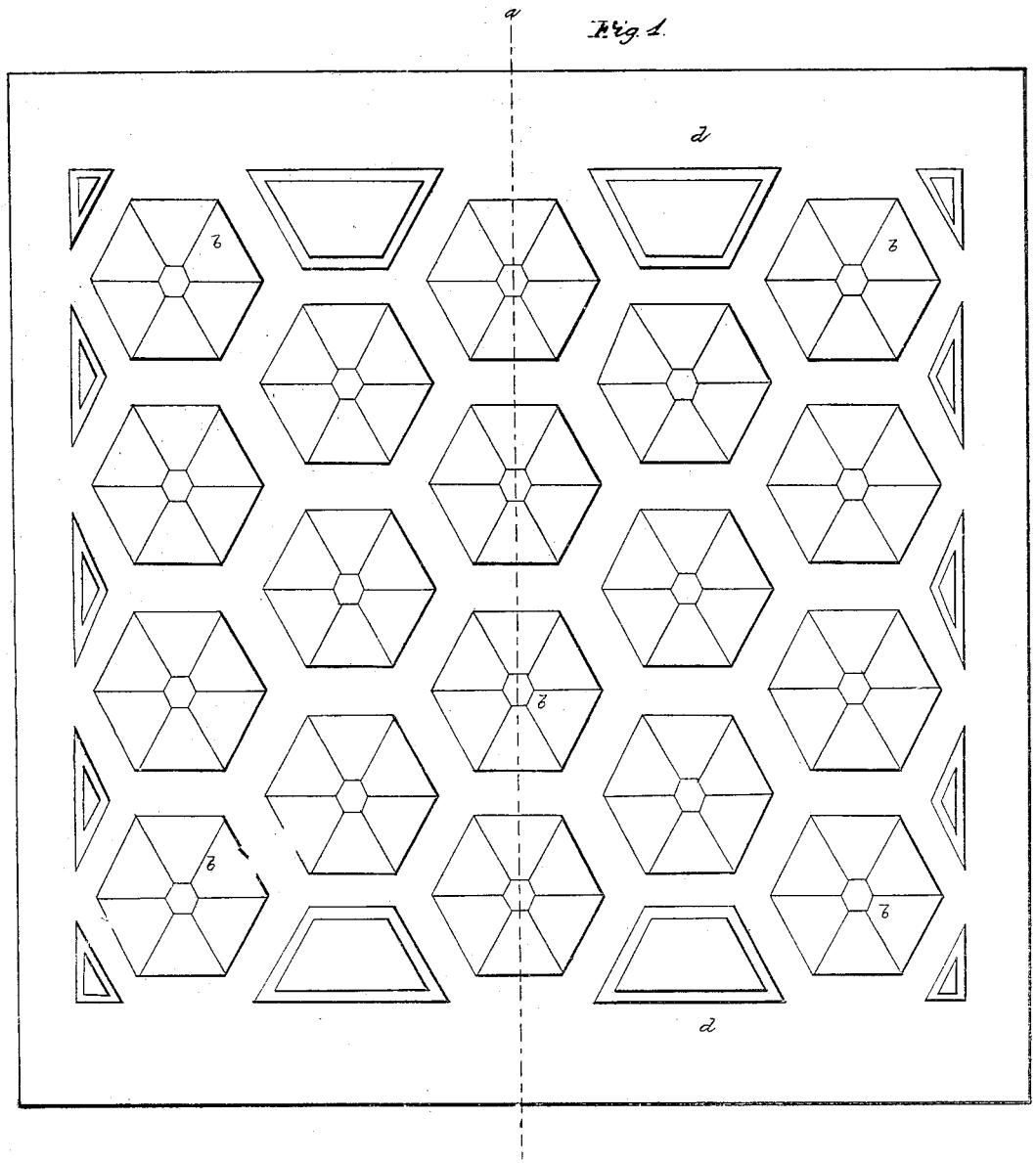

UNITED STATES PATENT OFFICE.

GEORGE R. JACKSON, OF NEW YORK, N. Y.

VAULT-LIGHT COVER.

Specification of Letters Patent No. 18,851, dated December 15, 1857.

*To all whom it may concern:*

Be it known that I, GEORGE R. JACKSON, of the city, county, and State of New York, have invented a new and useful Improvement in Skylights; and I do hereby declare that the following is a full and exact description thereof, reference being had to the accompanying drawings, making a part of this specification.

Figure 1 is a top view of my improved skylight and Fig. 2 is a section on the line $a$, $a$, of Fig. 1.

The principal feature of novelty in my improved skylight, consists in the peculiar shape of each of the glasses ($b$, $b$,) which form the illuminating portion thereof, viz: the said novel shape of each glass consists in giving to the concave under surface thereof the form of a hollow cone, or pyramid,— or the frustum of a hollow cone or pyramid—for the purpose of enabling the straight diagonal sides of the said concave surface to laterally refract and disperse the rays of light which pass through the same to the greatest possible degree. This form of glass possesses superior illuminating power to that ordinarily used in skylights, for the reason that the series of inclined planes composing the concavity in its under surface, acting by refraction, serve to diffuse the light uniformly throughout the apartment, instead of throwing a strong light immediately below the skylight, and leaving the remainder of said apartment in comparative darkness, as is the case when the light enters apartments through skylights whose glasses are in the form of lenses.

That my improved form of skylight glasses is much stronger than the flat glasses ordinarily used in skylights is self-evident: in fact they are nearly, if not quite as strong as the glasses of a double convex shape— which are ordinarily used in vault-covers, and which are of more than double the weight of my improved skylight glasses.

The small sized apertures in the metallic frame $d$, of my improved skylight, renders it burglar-proof, and it is not liable to be broken by persons walking over said skylight, or from the falling of timbers upon it from adjoining buildings during a fire.

What I claim as my invention and desire to secure by Letters Patent, as an improved manufacture, is

The within described skylight; the essential feature of novelty therein, consisting in combining with a metallic frame, a series of glasses whose upper surfaces are flat, or nearly so, while the under surface of each glass is in the form of a concavity whose sides are bounded by diagonally descending straight lines, or planes, substantially as herein set forth.

The above specification of my new and useful improvement in skylights, signed and witnessed this 2nd day of October, 1857.

GEORGE R. JACKSON.

Witnesses:
EDW. V. BURKE,
FRANCIS HILL.